United States Patent
Nishizawa et al.

(10) Patent No.: US 6,797,383 B2
(45) Date of Patent: Sep. 28, 2004

(54) SYNTHETIC RESIN LAMINATE HAVING BOTH POLARIZATION CHARACTERISTIC AND PHOTOCHROMISM CHARACTERISTIC

(75) Inventors: Chiharu Nishizawa, Tsukuba (JP); Kenji Kouno, Tsukuba (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 43 days.

(21) Appl. No.: 09/876,946

(22) Filed: Jun. 11, 2001

(65) Prior Publication Data

US 2002/0006505 A1 Jan. 17, 2002

(30) Foreign Application Priority Data

Jun. 9, 2000 (JP) .......................................... 2000-173454

(51) Int. Cl.[7] .............................................. B32B 27/40
(52) U.S. Cl. ................ 428/412; 428/423.1; 427/163.1; 427/164; 427/493.5; 351/44; 351/49; 351/163; 351/166
(58) Field of Search .............................. 428/412, 423.1, 428/425.9, 704; 427/163.1, 164, 493.5; 351/44, 49, 163, 166

(56) References Cited

U.S. PATENT DOCUMENTS

| | | | | |
|---|---|---|---|---|
| 4,992,218 A | * | 2/1991 | Sugio et al. ................ 264/1.34 |
| 5,051,314 A | * | 9/1991 | Ichikawa et al. ............ 369/272 |
| 5,603,757 A | * | 2/1997 | Mizuguchi et al. ......... 106/404 |
| 5,706,131 A | * | 1/1998 | Ichimura et al. ............ 359/490 |
| 5,757,459 A | * | 5/1998 | Bhalakia et al. ............ 351/164 |
| 5,827,614 A | * | 10/1998 | Bhalakia et al. ............ 427/160 |
| 5,856,860 A | * | 1/1999 | Bhalakia et al. ............ 351/164 |
| 6,180,033 B1 | * | 1/2001 | Greshes ..................... 264/1.32 |
| 6,231,183 B1 | * | 5/2001 | Dillon ........................ 351/163 |
| 6,328,446 B1 | * | 12/2001 | Bhalakia et al. ............ 351/163 |
| 2001/0035935 A1 | * | 11/2001 | Bhalakia et al. ............ 351/159 |
| 2002/0018177 A1 | * | 2/2002 | Dillon ........................ 351/163 |

FOREIGN PATENT DOCUMENTS

| JP | 7-94154 | 10/1995 | ........... B29D/11/00 |
|---|---|---|---|
| JP | 9-5683 | 1/1997 | ............. G02C/7/12 |

OTHER PUBLICATIONS

Abstract, 7–94154, Oct. 11, 1995.
Patent Abstract of Japan, 09005683 A, Jan. 10, 1997.

\* cited by examiner

*Primary Examiner*—James J. Seidleck
*Assistant Examiner*—Melanie Bissett
(74) *Attorney, Agent, or Firm*—Sughrue Mion, PLLC

(57) ABSTRACT

A synthetic resin laminate having both phtochromism characteristic and polarization characteristic consisting essentially of two transparent synthetic resin layers, a resin layer having phtochromism characteristic and a resin layer having polarization characteristic interposed between said two transparent synthetic resin layers and an adhesive layer to adhere said resin layer having polarization characteristic to said one transparent synthetic resin layer, wherein said one transparent synthetic resin layer to contact said resin layer having phtochromism characteristic has a thickness of 50 μm or above and a retardation value of 150 nm or below, or 3000 nm or above.

14 Claims, 1 Drawing Sheet

SYNTHETIC RESIN LAMINATE HAVING BOTH POLARIZATION CHARACTERISTIC AND PHOTOCHROMISM CHARACTERISTIC

BACKGROUND OF THE INVENTION

1) Field of the Invention

The present invention relates to a synthetic resin laminate having both polarization characteristics and photochromism characteristics, and specifically to a synthetic resin laminate having good appearance and excellent optical characteristics, which is used for glare-reducing materials, such as goggles and sun glasses for sport use, and can be readily produced and processed.

2) Prior Art

Goggles and sun glasses for sport use which have polarization characteristics exhibit excellent cutting characteristics against reflected light. Thus, their usefulness in outdoor activities such as marine sports, skiing and fishing has come to be noticed widely. Recently, their demand has suddenly expanded. Particularly, when a polycarbonate resin is used as the material for goggles and sun glasses, the demand is remarkable since the resin exhibits excellent impact resistance.

On the other hand, with the rapid development of excellent photochromic pigments, the characteristic of photochromic sun glasses to change transmittance depending upon surrounding brightness has also been remarkably improved. Therefore, photochromic sun glasses are becoming more popular.

Ideas concerning a synthetic resin glare-reducing material having both the function of changing transmittance depending on surrounding brightness and the function of preferentially blocking reflected light have been suggested. However, they have not been put into practice yet, because the process for producing synthetic resin glare-reducing materials was poor or properties of a product thus obtained were insufficient in the present production process.

For example, in the production of a polycarbonate lens described in Japanese Patent Publication No.7-94154, when a process comprising adding a photochromic pigment in the production of a polycarbonate sheet to be used is applied, a lens thus obtained is insufficient in both response speed and contrast. Also in resins other than a polycarbonate, a sheet with strength usable as a glare-reducing material usually causes problems that degradation of a photochromic pigment occurs during kneading; the kneading is troublesome and contrast or response speed of a product thus obtained is small.

In a process comprising coating a surface layer of a polarizing lens to be obtained in the process described in Japanese Patent Publication No.7-94154 with a photochromic pigment-containing resin, it is difficult to form a lens with good contrast since the thickness of an applicable coating layer is limited.

SUMMARY OF THE INVENTION

The present invention is to provide a synthetic resin laminate for a glare-reducing material having both polarization characteristic and photochromism characteristic which can be readily processed.

As a result of extensive trials and studies for various methods, the inventors have found that a laminate interposed between a resin layer having photochromism characteristics and a resin layer having polarization characteristics between two transparent synthetic resins exhibits not only excellent photochromism characteristics and polarization characteristics, but also processing into curved surfaces and injection molding can be readily performed. The laminate can also be produced in a very simple process.

That is, the present invention provides a synthetic resin laminate having both photochromism characteristics and polarization characteristics consisting essentially of (1) two transparent synthetic resin layers, (2) a resin layer having photochromism characteristics and a resin layer having polarization characteristics interposed between the two transparent synthetic resin layers and (3) an adhesive layer to adhere the resin layer having polarization characteristics and one of the two transparent synthetic resin layers, wherein the other one of the two transparent synthetic resin layers contacts the resin layer having photochromism characteristics and has a thickness of 50 $\mu$m or above and a retardation value of 150 nm or below, or 3000 nm or above.

It is preferable that said one transparent synthetic resin contacts the adhesive layer having a thickness of 100 $\mu$m or above.

It is preferable that said transparent synthetic resin is a polycarbonate resin. Also resins excellent in impact resistance, transparency and strength, other than a polycarbonate resin can be used.

Further, it is preferable that said resin layer having photochromism characteristics is a urethane resin layer containing a photochromic pigment(s).

It is preferable that said resin layer having polarization characteristics is a polarizing film.

DETAILED DESCRIPTION OF THE INVENTION

Figure 1:
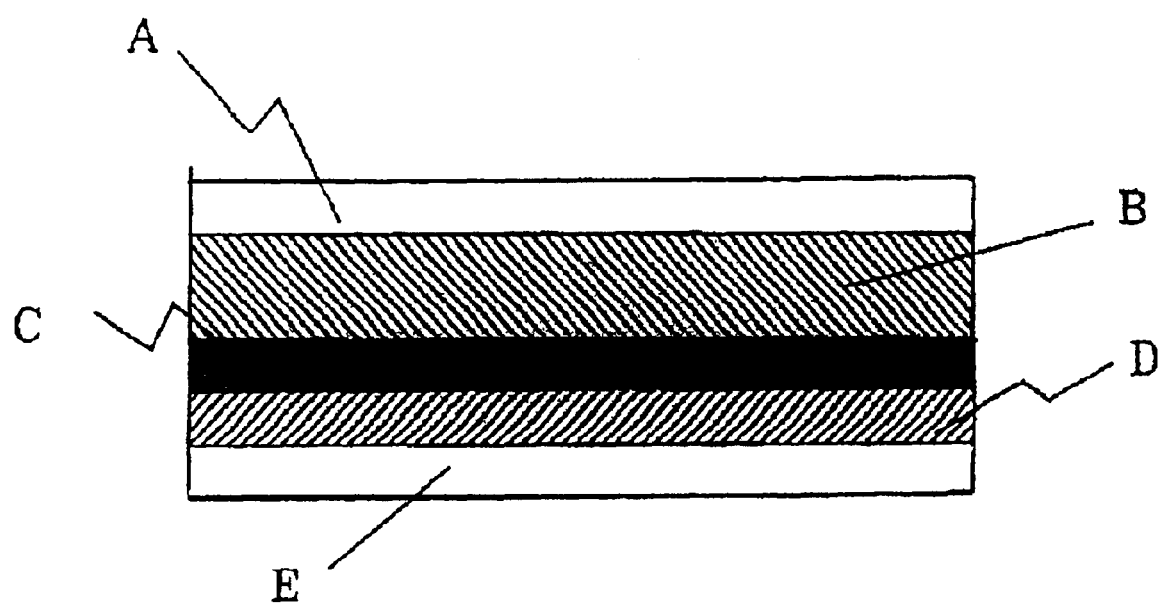
FIG. 1 is a cross sectional view of the synthetic resin laminate in the present invention.

The present invention will be described in detail using FIG. 1.

In FIG. 1, (A) shows a transparent synthetic resin layer (hereinafter, "(A)"); (B) shows a resin layer having photochromism characteristics (hereinafter, "(B)"); (C) shows a resin layer having polarization characteristics (hereinafter, "(C)"); (D) shows an adhesive layer (hereinafter, "(D)") and (E) shows a transparent synthetic resin layer (hereinafter, "(E)").

When the synthetic resin laminate of the present invention is used as a glare-reducing material such as sun glasses and sporting goggles, the side of (A) (hereinafter, "(A) side") is used as the outside and the side of (E) (hereinafter, "(E) side") is used as the inside. For example, a user of sun glasses employing the synthetic resin laminate of the present invention sees objects from the (E) side of the sun glass lens of the inside through the (A) side of the outside.

When the synthetic resin laminate is processed into curved surfaces, it is processed so as to form a convex shape in the (A) side and a concave shape in the (E) side. Further, when other resins are adhered to the synthetic resin laminate by injection molding, etc., notwithstanding a flat sheet or an article processed into curved surfaces, the other resin with low UV absorption and transparency may be adhered to the (A) side or the (E) side of the laminate. With respect to the other resin added to UV absorption or pigment, it is preferable that the other resin is adhered to the (A) side.

When the components, concentration and thickness of (A), (B), (C), (D) and (E) are combined as described herein, the synthetic resin laminate exhibits excellent optical characteristics and it becomes possible to form it into curved surfaces by injection molding can possibly be made into curved surfaces and be injection molded.

Each layer in the synthetic resin laminate is described in detail below.

It is preferable that (A) has a thickness of 50 μm or above and a retardation value (hereinafter, "Re") of 150 nm or below, or 3000 nm or above and substantially, (A) is a sheet to transmit light having a wave length of 350 nm or above.

In the present invention, Re (nm) of the synthetic resin layer is defined in the following formula.

Retardation value $(Re)(nm) = \Delta n \times d$ wherein $\Delta n$ is a birefringence of the synthetic resin layer and d is a thickness (nm) of the synthetic resin layer.

When the synthetic resin laminate is used as a glare-reducing material outside the above-mentioned range of Re, it is not preferable since a colored interference figure is generated.

When a polycarbonate resin is used as (A), it is required that it has a thickness of 50 to 200 μm and Re of 150 nm or below or a thickness of 300 μm to 1 mm and Re of 3000 nm or above. Outside the above-mentioned range, the following problems occur.

(1) When the synthetic resin laminate is processed into curved surfaces, an interference figure is observed.

(2) The synthetic resin laminate does not possess satisfactory strength.

(3) A processed article with good appearance cannot be obtained.

(4) Polarization characteristics are deteriorated in an injection molding.

(5) It is not practical since it is difficult to obtain a raw material.

The polycarbonate resin sheet having the above-mentioned range of Re in the present invention can be produced, for example, by the following process.

That is, the sheet having Re of 150 nm or below can be produced by a casting process or a non-stretching extrusion process. The sheet having Re of 3000 nm or above can be produced by changing a polycarbonate resin to a sheet by an extrusion process and then stretching substantially the sheet in one direction while heating to a temperature (e.g., about 140 to about 180° C.) somewhat higher than the glass transition temperature. In such a case, stretching magnification exerts an influence on Re.

It is preferable that (B) is an urethane resin layer containing a photochromic pigment(s) and (B) has a thickness of 50 to 250 μm. When the thickness is below 50 μm, color development is insufficient under irradiation of an ultraviolet light and contrast becomes low. When the thickness is above 250 μm, contrast is sufficient, but economy becomes bad since a large amount of high price photochromic pigment is used.

The photochromic pigment is not limited on the condition that it has compatibility with the urethane resin layer. Spiropyrane compounds, spiroxazine compounds and naphthopyran compounds are preferable.

Examples of the spiropyran compound include 1',3',3'-trimethylspiro(2H-1-benzopyran-2,2'-indoline), 1',3',3'-trimethylspiro-8-nitro(2H-1-benzopyran-2,2'-indoline), 1',3',3'-trimethyl-6-hydroxyspiro(2H-1-benzopyran-2,2'-indoline), 1',3',3'-trimethylspiro-8-methoxy(2H-1-benzopyran-2,2'-indoline), 5'-chloro-1',3',3'-trimethyl-6-nitrospiro(2H-1-benzopyran-2,2'-indoline), 6,8-dibromo-1',3',3'-trimethylspiro(2H-1-benzopyran-2,2'-indoline), 8-ethoxy-1',3',3',4',7'-pentamethylspiro(2H-1-benzopyran-2,2'-indoline), 5'-chloro-1',3',3'-trimethylspiro-6,8-dinitro (2H-1-benzopyran-2,2'-indoline), 3,3,1-diphenyl-3H-naphtho(2,1-b) pyran, 1,3,3-triphenylspiro[indoline-2,3'-(3H)-naphtho(2,1-b)pyran], 1-(2,3,4,5,6-pentamethylbenzyl)-3,3-dimethylspiro[indoline-2,3'-(3H)-naphtho(2,1-b)pyran], 1-(2-methoxy-5-nitrobenzyl)-3,3-dimethylspiro[indoline-2,3'-naphtho(2,1-b)pyran], 1-(2-nitrobenzyl)-3,3-dimethylspiro[indoline-2,3'-naphtho (2,1-b)pyran], 1-(2-naphthylmethyl)-3,3-dimethylspiro [indoline-2,3'-naphtho (2,1-b)pyran] and 1,3,3-trimethyl-6'-nitro-spiro[2H-1-benzopyran-2,2'-[2H]-indole].

Examples of the spiroxazine compound include 1,3,3-trimethylspiro [indolino-2,3'-[3H] naphth [2,1-b] [1,4] oxazine], 5-methoxy-1,3,3-trimethylspiro [indolino-2,3'-[3H] naphth [2,1-b] [1,4] oxazine], 5-chloro-1,3,3-trimethylspiro [indolino-2,3'-[3H] naphth [2,1-b] [1,4] oxazine], 4,7-diethoxy-1,3,3-trimethylspiro [indolino-2,3'-[3H] naphth [2,1-b] [1,4] oxazine], 5-chloro-1-butyl-3,3-dimethylspiro [indolino-2,3'-[3H] naphth [2,1-b] [1,4] oxazine], 1,3,3,5-tetramethyl-9'-ethoxyspiro [indolino-2,3'-[3H] naphth [2,1-b] [1,4] oxazine], 1-benzyl-3,3-dimethylspiro [indoline-2,3'-[3H] naphth [2,1-b] [1,4] oxazine], 1-(4-methoxybenzyl)-3,3-dimethylspiro [indoline-2,3'-[3H] naphth [2,1-b][1,4] oxazine], 1-(2-methylbenzyl)-3,3-dimethylspiro [indoline-2,3'-[3H] naphth [2,1-b] [1,4] oxazine], 1-(3,5-dimethylbenzyl)-3,3-dimethylspiro [indoline-2,3'-[3H] naphth [2,1-b] [1,4] oxazine], 1-(4-chlorobenzyl)-3,3-dimethylspiro [indoline-2,3'-[3H] naphth [2,1-b] [1,4] oxazine], 1-(4-bromobenzyl)-3,3-dimethylspiro [indoline-2,3'-[3H] naphth [2,1-b] [1,4] oxazine], 1-(2-fluorobenzyl)-3,3-dimethylspiro [indoline-2,3'-[3H] naphth[2,1-b] [1,4] oxazine], 1,3,5,6-tetramethyl-3-ethylspiro [indoline-2,3'-[3H] pyrido [3,2-f] [1,4]-benzoxazine], 1,3,3,5,6-pentamethylspiro [indoline-2,3'-[3H] pyrido [3,2-f] [1,4]-benzoxazine], 6'-(2,3-dihydro-1H-indole-1-yl)-1,3-dihydro-3,3-dimethyl-1-propyl-spiro [2H-indole-2,3'-[3H] naphth [2,1-b] [1,4] oxazine], 6'-(2,3-dihydro-1H-indole -1-yl)-1,3-dihydro-3,3-dimethyl-1-(2-methylpropyl)-spiro [2H-indole-2,3'-[3H]-naphth [2,1-b] [1,4] oxazine], 1,3,3-trimethyl-1-6'-(2,3-dihydro-1H-indole-1-yl)-spiro [2H-indole-2,3'-[3H]-naphth [2,1-b] [1,4] oxazine], 1,3,3-trimethyl-6'-(1-piperidinyl)-spiro [2H-indole-2,3'-[3H]-naphth [2,1-b] [1,4] oxazine], 1,3,3-trimethyl-6'-(1-piperidinyl)-spiro[2H-indole-2,3'-[3H]-naphth[2,1-b] [1,4] oxazine], 1,3,3-trimethyl-6'-(1-piperidinyl)-6-(trifluoromethyl)-spiro [2H-indole-2,3'-[3H]-naphth [2,1-b] [1,4] oxazine and 1,3,3,5,6-pentamethyl-spiro [2H-indole-2,3'-[3H] naphth [2,1-b] [1,4] oxazine].

Examples of the naphthopyran compound include 3,3-diphenyl-3H-naphtho [2,1-b] pyran, 2,2-diphenyl-2H-naphtho [1,2-b] pyran, 3-(2-fluorophenyl)-3-(4-methoxyphenyl)-3H-naphtho [2,1-b] pyran, 3-(2-methyl-4-methoxyphenyl)-3-(4-ethoxyphenyl)-3H-naphtho [2,1-b] pyran, 3-(2-furil)-3-(2-fluorophenyl)-3H-naphtho [2,1-b] pyran, 3-(2-thienyl)-3-(2-fluoro-4-methoxyphenyl)-3H-naphtho [2,1-b] pyran, 3-{2-(1-methylpyrrolidinyl)}-3-(2-methyl-4-methoxyphenyl)-3H-naphtho [2,1-b] pyran, Spiro [bicyclo [3.3.1] nonane-9,3'-3H-naphtho [2,1-b] pyran], Spiro [bicyclo [3.3.1] nonane-9-2'-3H-naphtho [2,1-b] pyran], 4-[4-[6-(4-morpholynyl)-3-phenyl-3H-naphtho [2,1-b] pyran-3-yl] phenyl]-morpholine, 4-[3-(4-methoxyphenyl)-3-phenyl-3H-naphtho [2,1-b] pyran-6-yl]- morpholine, 4-[3,3-bis(4-methoxyphenyl)-3H-naphtho [2,1-b] pyran-6-yl]-morpholine, 4-[3-phenyl-3-[4-(1-piperidinyl) phenyl]-3H-naphtho [2,1-b] pyran-6-yl]-morpholine and 2,2-diphenyl-2H-naphtho [2,1-b] pyran.

As processes for forming the urethane resin layer containing a photochromic pigment(s), the following various processes can be applied.

(1) A process comprising dissolving a polyurethane resin and a photochromic pigments(s) in a solvent, coating a solution thus obtained on (A) or (C), then evaporating the solvent and then adhering the urethane resin layer to (C) or (A) with heating.

(2) A process comprising heat melt adhering a polyurethane resin kneaded a photochromic pigments(s) to a transparent resin sheet so as to form a uniform thickness.

(3) A process comprising coating a resin solution dissolved a photochromic pigment(s) and a curing agent in a polyurethane prepolymer on (A) or (C), then evaporating a solvent (in case of containing a solvent), then adhering the urethane resin layer to (A) or (C) and then performing cure.

Although all of the above-mentioned processes can be applied in principle, it is preferable that a two-liquid type polyurethane containing a polyurethane prepolymer and a curing agent is used, considering productivity and necessary apparatus.

As the polyurethane prepolymer, a compound reacted isocyanate and polyol in a specific proportion is used. That is, the polyurethane prepolymer is a compound with an isocyanate group on both ends to be obtained from diisocyanate and polyol. It is preferable that the diisocyanate compound to be used for the polyurethane prepolymer is diphenylmethane-4,4'-diisocyanate (MDI). It is preferable that the polyol is polypropylene glycol (PPG) having a polymerization degree of 5 to 30.

The polyurethane prepolymer has a number average molecular weight of 500 to 5000, preferably 1500 to 4000 and more preferably 2000 to 3000.

The curing agent is not limited on the condition that it is a compound having two or above hydroxyl groups. Examples of the curing agent include polyurethane polyol, polyether polyol, polyester polyol, acrylic polyol, polybutadiene polyol and polycarbonate polyol. Among them, polyurethane polyol having a hydroxy group on its end to be obtained from specific isocyanate and specific polyol is preferable, and particularly it is preferable to use polyurethane polyol having a hydroxy group on at least both ends to be derived from diisocyanate and polyol. It is preferable that said diisocyanate is tolylene-diisocyanate (TDI) and said polyol is PPG having a polymerization degree of 5 to 30.

The curing agent has a number average molecular weight of 500 to 5000, preferably 1500 to 4000 and more preferably 2000 to 3000.

The ratio of isocyanate group (I) of the polyurethane prepolymer to hydroxyl group (H) of the curing agent of 0.9 to 20 and preferably 1 to 10 may be preferably applied as a standard.

Solvents such as ethyl acetate, tetrahydrofuran and toluene may be applied to the polyurethane prepolymer and the curing agent in order to adjust viscosity.

(C) may be basically any polarizing film. It is preferable that (C) has a comparatively high transmittance of 30% or above and a thickness of 10 to 100 $\mu$m. When the thickness is below 10 $\mu$m, strength becomes low and it is difficult to obtain intended polarization characteristic. When the thickness is above 100 $\mu$m, it is difficult to obtain uniformity of the thickness and ununiformity of color often occurs. An iodine type polarizing film is not so preferable and a dye type polarizing film is preferable, considering processing with heating such as injection molding.

Particularly, as described in Japanese Patent Kokai (Laid-open) No.63-311203, a film with high heat resistance produced by a process of production comprising performing particular treatment for a film with a metal ion(s) and boric acid to stabilize the film is preferable. Further, it is very preferable to use a polarizing film with UV cuttingcharacteristics.

(D) may be any adhesive on the condition that conventional polycarbonate resin can be adhered to a polarizing film. A polyurethane resin to be used in the resin layer having photochromism characteristics of above-mentioned (B) is usually applied as the adhesive.

Particularly, it is preferable to apply a two-liquid type polyurethane containing a polyurethane prepolymer and a curing agent, considering post processing. The range of thickness of (D) is preferably 5 to 100 $\mu$m and more preferably 5 to 50 $\mu$m. When the thickness is below 5 $\mu$m, it is difficult to obtain sufficient adhesive force. When the thickness is above 100 $\mu$m, the adhesive force is sufficient, but a long time is required to evaporate a solvent in the adhesive, so that productivity and economy becomes bad. It is possible to provide UV cutting potency for the laminate by adding a UV absorber to (D).

When the synthetic resin laminate is used in an injection molding, it is necessary that (E) has a thickness of 100 $\mu$m or above. When the thickness is below 100 $\mu$m, lines and crack are often generated. Further, it is necessary to select the thickness of (E) so as to make total thickness of the synthetic resin laminate 0.6 mm or above from the aspect of strength and quality except that afterwards its thickness is increased by a process such as injection molding.

Particularly, a preferable process for producing the synthetic resin laminate of the present invention is as follows.

That is, a resin solution containing a photochromic pigment(s), a polyurethane prepolymer and a curing agent is coated on a polarizing film and then standing at a temperature of 20 to 50° C. for about 5 to 60 minutes. Then, a transparent synthetic resin sheet (A) is adhered to the resin solution layer. An adhesive containing a solvent is coated on the side of the polarizing film of the laminate thus obtained and then standing for about 5 to 60 minutes at a temperature of 20 to 50° C. and the solvent is evaporated. Then, another transparent synthetic resin layer(E) is adhered to the adhesive. The laminate thus obtained is heat cured usually at a temperature of 60 to 140° C. over 2 hours to one week, whereby the synthetic resin laminate of the present invention is produced.

PREFERRED EMBODIMENTS OF THE INVENTION

The present invention will be described in more detail below, referring to examples which are not intended to limit the scope of the present invention.

Each property was measured by the following methods.
[Transmittance]

The measurement was performed with a spectrophotometer, manufactured by Nihon Bunko k.k., in Japan. [Single Sheet Transmittance, Paralled Position Transmittance and Perpendicularly Crossing Position Transmittance]

Single sheet Transmittance, parallel position transmittance ($H_0$: light transmittance where the same species of two polarizing films or two sheets to each other are overlapped so as to pose orientation direction toward the same direction to each other) and perpendicularly crossing position transmittance ($H_{90}$: light transmittance where the same species of two polarizing films or two sheets to each other are overlapped so as to pose orientation direction toward a direction perpendicular to each other) are an average value made visible sensitivity amendment in a visible radiation of 400 to 700 nm.

[Polarization Degree]

Polarization degree was determined from the following formula $$H(\%) = \sqrt{\frac{H_0 - H_{90}}{H_0 + H_{90}}} \times 100(\%)$$

[Retardation Value (Re)]

The measurement was performed with a polarizing microscope, manufactured by Oak Seisakusho, in Japan, TEM-120AFT.

[Transmittance Under Irradiation of Ultraviolet Light]

A single wave length light of 360 nm was irradiated with a monochromatic light source and transmittance was measured after 5 minutes from the starting of the irradiation.

EXAMPLE 1

(1) Preparation of Photochromic Pigment-containing Resin Solution.

15 g of a polyurethane prepolymer having a NCO group equivalent weight (equivalent weight: average molecular weight per one functional group) of 1500 prepared from diphenylmethane-4,4'-diisocyanate (MDI) and polypropylene glycol (PPG) having an average polymerization degree of 15, 3 g of a curing agent having a hydroxyl group equivalent weight of 1050 prepared from tolylenediisocyanate and polypropylene glycol having an average polymerization degree of 10, 0.25 g of a photochromic pigment ① [3,3-diphenyl-3H-naphtho (2,1-b) pyran], 0.08 g of a photochromic pigment ① [spiro (2H-indole-2,3'-(3H)-naphtho (2,1-b) (1,4) oxazine)-1,3-dihydro-1,3,3-trimethyl-6'-(1-piperidinyl)], 0.18 g of a hindered amine compound [bis(2,2,6,6-tetramethyl-4-piperidinyl) sebacate] and 12 g of tetrahydrofuran were uniformly mixed.

(2) Preparation of Polarizing Film

A polyvinyl alcohol film, manufactured by Kurare k.k., in Japan, trade name; Kurarevinylone #7500 was dyed at 35° C. for 6 minutes in an aqueous solution (dyeing solution) containing 0.37 g/L of Chlorantin fast red (C.I. (color index generic name): Direct Red 81), 0.28 g/L of Brilliant blue 6B (C.I.: Direct Blue 1), 0.28 g/L of Direct copper blue 2B (C.I.: Direct Blue 168), 0.93 g/L of Primuler blue 6 GL (C.I.: Direct Blue 202) and 0.28 g/L of Chrysophenine (C.I.: Direct Yellow 12) and then stretched 5 times in the dyeing solution to the direction of uniaxis.

Then, the above-mentioned film was immersed in an aqueous solution (treating solution) containing 0.30 g/L of nickel acetate tetrahydrate and 12.2 g of boric acid at a room temperature for 3 minutes in the state maintained stretching. Further, the film was taken out from the aqueous solution in the state maintained the tension and water washed and dried, and then subjected to heat treatment at 110° C. for 7 minutes.

The polarizing film thus obtained presented light grey and had a thickness of 30 μm and its optical characteristics were single sheet transmittance: 41.8% and polarization degree: 96.3%.

(3) Preparation of Resin Solution for Adhesive Layer 15 g of above-mentioned polyurethane prepolymer, 3 g of above-mentioned curing agent and 27 g of ethyl acetate were uniformly mixed.

(4) Production of Laminate

The resin solution obtained by the process of above-mentioned (1) was coated with a doctor blade of coating thickness 300 μm, manufactured by Yoshimitsu Seiki k.k., in Japan on the polarizing film obtained in above-mentioned (2), and then standing for 10 minutes in the atmosphere of 45° C. Then, the surface coated with the resin liquid was adhered to a polycarbonate film of thickness 120 μm and Re 60 nm. The thickness of the laminate was 313 μm by measurement with a micrometer. It was found that the thickness of the resin layer having photochromism characteristic was 163 μm.

Then, a urethane adhesive was coated with a bar coater #24 on the side of the polarizing film in the laminate so as to form a thickness of 10 μm after evaporation of the solvent and a solvent was vaporized and then a polycarbonate sheet of thickness 300 μm was adhered thereto.

The laminate thus obtained was heat cured at 70° C. for 2 days. The total thickness of the laminate thus obtained was 620 μm.

When a light was not irradiated on the laminate, the transmittance was 41.9% and the polarization degree was 96.2%. Thus, the optical characteristics of the laminate were the same as those of the polarizing film. The color of the non-irradiated laminate was light grey.

On the other hand, when a sun light was irradiated on the laminate, the color of the laminate was changed to deep brown within 10 seconds. It was found that when the irradiation was stopped, the color reverted to original light grey in a short time of about 10 seconds.

The single sheet transmittance was 24.5% and the polarization degree was 96.4% during irradiation of an ultraviolet light. The visual observation result under a sun light was numerically confirmed. The appearance of the laminate was very good.

EXAMPLE 2

The laminate sheet obtained in Example 1 was cut into a size of 80 mm φ and then aspirated up to 50 mmHg for 1 minute simultaneously with starting of heating in the atmosphere of 147° C. and vacuum molded for 6 minutes to process into a lens of curvature radius 80 mm.

The appearance of the article obtained by processing into curved surfaces was very good and no interference figure thereof was observed. The optical characteristics of the processed article were the same as those prior to processing in both cases of light irradiation and non-irradiation.

EXAMPLE 3

In order to adhere the sheet subjected to processing into curved surfaces obtained in Example 2 to a molded article with an injection molder of clamping force 150 ton, it was in advance installed in a mold of a set temperature 110° C. with cavity of the curved form. An aromatic polycarbonate resin (trade name: IUPILON H-4000, manufactured by Mitsubish Gas Chemical Co., Inc.) put in a hot wind drier at 120° C. for 6 hours or above sufficient to satisfy the mold cavity in a molder cylinder of set temperature 260° C. was weighed. The molten polycarbonate resin was injection charged in the cavity of the closed molder installed the sheet subjected to processing into curved surfaces and then maintained for 30 seconds under a retention pressure of 700 kg/cm² and then the molded article was cool solidified in the mold for 120 seconds. Then, the mold was opened and the molded article was taken out from the mold.

The surface of molded article thus obtained was adhered to the sheet subjected to processing into curbed surfaces in advance installed. The molded article with good appearance was obtained. The molded article possesses both polarization characteristic and photochromism characteristic and its strain was small.

EXAMPLE 4

(1) Preparation of Photochromic Pigment-containing Resin Solution.

The preparation was performed in the same manner as in Example 1 except that the photochromic pigments were changed to 0.17 g of Reversacol Flame, manufactured by James Robinson Co.

(2) Preparation of Polarizing Film

The preparation was performed in the same manner as in Example 1.

(3) Production of Laminate

A laminate of both sides thickness 600 $\mu$m and total thickness about 1.4 mm was obtained in the same manner as in Example 1 by using two polycarbonate sheets of thickness 600 $\mu$m and Re 4000 nm.

The laminate presented deep orange under the irradiation of a sun light and light grey under the non-irradiation of a light. The transmittance was 42.1% and the polarization degree was 95.7%.

The laminate was cut into a shape of length 40 mm and width 200 mm and then subjected to processing into curved surfaces to form a spherical surface with curvature radius 85 mm under the conditions according to Example 2.

The color and brightness of the article subjected to processing into curved surfaces were the same as those prior to processing in both cases of irradiation and non-irradiation of a sun light.

Its appearance was very good without observing skewness and no interference figure was observed. Thus, it was judged that it was suitable to skiing goggle.

COMPARATIVE EXAMPLE 1

The laminate was produced in the same manner as in Example 1 except that Re of the polycarbonate film corresponding to (A) was changed from 60 nm to 1500 nm. The thickness of the laminate thus obtained was 622 $\mu$m. The laminate was subjected to processing into curved surfaces to make a lens. When a reflected light was seen through the lens, an interference figure was observed.

COMPARATIVE EXAMPLE 2

The laminate was produced in the same manner as in Example 1 except that the resin solution obtained in (1) was coated on the polarizing film obtained in (2) and then the surface coated with the resin solution was adhered to a polycarbonate sheet of thickness 300 $\mu$m and Re 1000 nm and then a urethane adhesive was coated on the side of the polarizing film in the laminate and adhered to a polycarbonate film of thickness 120 $\mu$m and Re 60 nm. The thickness of the laminate thus obtained was 614 $\mu$m.

Sunlight was irradiated on the side of the polycarbonate film of thickness 120 $\mu$m and Re 60 nm in the laminate. The laminate was changed to a somewhat brownish color, but remarkable color development as in Example 1 was not observed. The transmittance under irradiation of an ultraviolet light from the same direction as that of a sun light was about 36%.

COMPARATIVE EXAMPLE 3

The laminate was produced in the same manner as in Example 1 except that the resin solution was prepared without adding the photochromic pigment ① and the photochromic pigment ②. The thickness of the laminate thus obtained was 618 $\mu$m. When the laminate was exposed to sun light, no color development was observed and both transmittance and polarization degree in non-irradiation of an ultraviolet light were the same as those in the case of non-irradiation of a light in Example 1. Glare reduction was not attained so much as in the laminate produced in Example 1 to develop color under irradiation of an ultraviolet light.

COMPARATIVE EXAMPLE 4

The photochromic pigment-containing resin solution was prepared in the same manner as in Example 1. The resin solution was coated on a polycarbonate sheet of thickness 300 $\mu$m, with a doctor blade having a thickness of 300 $\mu$m, manufactured by Yoshimitsu Seiki k.k., in Japan and then standing for 10 minutes in the atmosphere of 45° C. Then, the surface coated with the resin solution was adhered to a polycarbonate film of thickness 120 $\mu$m and Re 60 nm. The thickness of the laminate thus obtained was 578 $\mu$m and the thickness of the photochromic resin layer was 158 $\mu$m by measurement with a micrometer. Then, the laminate was heat cured for 2 days at 70° C. Total thickness of the laminate thus obtained was 575 $\mu$m.

The transmittance of the laminate in non-irradiation of an ultraviolet light was 83% and the transmittance under irradiation of an ultraviolet light was 64%. The laminate has no polarization characteristic and glare-reduction was not attained so much as the laminate of Example 1.

The synthetic resin laminate of the present invention, having both polarization characteristics and photochromism characteristics is suitably applicable to the use of glare-reducing materials such as sporting goggles and sun glasses and a synthetic resin sun glass with magnification can be readily produced by the combination by injection molding.

What is claimed is:

1. A synthetic resin laminate having both photochromism characteristics and polarization characteristics consisting essentially of:
   (1) two polycarbon ate resin layers,
   (2) a resin layer having photochromism characteristics comprising a cured polyurethane mixture of a polyurethane prepolymer, a curing agent consisting of a compound with a hydroxyl group on at least both ends obtained from diisocyanate and polyol, and at least one photochromic pigment and a resin layer having a polarization characteristics, said resin layer having photochromism characteristics and said resin layer having polarization characteristics being adhered to each other and interposed between said two polycarbonate resin layers, and
   (3) an adhesive layer to adhere said resin layer having polarization characteristics to one of said two polycarbonate resin layers, wherein the other one of said two polycarbonate resin layers adheres to said resin layer having photochromism characteristics and has a thickness of 50 $\mu$m or above and a retardation value of 150 nm or below, or 3000 nm or above.

2. The synthetic resin laminate according to claim 1, wherein said one polycarbonate resin layer to adhere to said adhesive layer has a thickness of 100 $\mu$m or above.

3. The synthetic resin laminate according to claim 1, wherein said resin layer having photochromism characteristics has a thickness of 50 $\mu$m to 250 $\mu$m.

4. The synthetic resin laminate according to claim 1, wherein said polyurethane prepolymer is a compound with an isocyanate group on both ends obtained from diisocyanate and polyol.

5. The synthetic resin laminate according to claim 1, wherein said polyurethane prepolymer is a compound derived from a prepolymer having a number average molecular weight of 500 to 5000 and a curing agent having a number molecular weight of 500 to 5000.

6. The synthetic resin laminate according to claim 4, wherein said polyurethane prepolymer is a compound with an isocyanate group on both ends derived from diphenylmethane-4,4'-diisocyanate and polypropylene glycol.

7. The synthetic resin laminate according to claim 1, wherein said curing agent is a compound with a hydroxyl group on at least both ends obtained from tolylenediisocyanate and polypropylene glycol.

8. The synthetic resin laminate according to claim 1, wherein said cured polyurethane mixture further contains a hindered amine compound and/or a hindered phenol compound.

9. The synthetic resin laminate according to claim 1, wherein said resin layer having polarization characteristics comprises a polarizing film containing a dye(s) and being treated with a metal ion(s) and boric acid.

10. A molded article formed into a shape of curved surface by vacuum molding the synthetic resin laminate described in claim 1.

11. A process for producing a synthetic resin laminate having both photochromism characteristics and polarization characteristics according to claim 1, which comprises:

mixing uniformly a polyurethane prepolymer, a curing agent consisting of a compound with a hydroxyl group on at least both ends obtained from diisocyanate and polyol and at least one photochromic pigment to produce a resin solution;

coating said resin solution containing said at least one photochromic pigment, said polyurethane prepolymer and said curing agent on a resin layer having polarization characteristics to form a resin solution layer;

adhering a first polycarbonate sheet to said resin solution layer;

coating an adhesive on the resin solution non-coated side of said resin layer having polarization characteristics;

adhering a second polycarbonate resin sheet to said adhesive coated on said resin layer having polarization characteristics to form a laminate; and heat curing said resin solution in said laminate thus obtained, thereby obtaining the synthetic resin laminate having both polarization characteristics and photochromism characteristics.

12. The process according to claim 11, wherein said adhesive contains a solvent.

13. The process according to claim 12, wherein said solvent is removed by evaporation after coating said adhesive on said polarizing film.

14. The process according to claim 11, wherein said heat cure is performed at a temperature of 60 to 140° C. over 2 hours to one week.

* * * * *